United States Patent
Mitchell

(10) Patent No.: US 11,716,427 B2
(45) Date of Patent: Aug. 1, 2023

(54) MICROARRAYER FOR DISPENSING REAGENT ON A SUBSTRATE AND A METHOD FOR OBTAINING IMAGES OF THE SUBSTRATE DURING THE OPERATION OF SAID MICROARRAYER

(71) Applicant: Arrayjet Limited, Lothian (GB)

(72) Inventor: Benjamin Mitchell, Northumberland (GB)

(73) Assignee: Arrayjet Limited, Lothian (GB)

( * ) Notice: Subject to any disclaimer, the term of this patent is extended or adjusted under 35 U.S.C. 154(b) by 608 days.

(21) Appl. No.: 16/640,114

(22) PCT Filed: Sep. 5, 2018

(86) PCT No.: PCT/GB2018/052505
§ 371 (c)(1),
(2) Date: Feb. 19, 2020

(87) PCT Pub. No.: WO2019/048844
PCT Pub. Date: Mar. 14, 2019

(65) Prior Publication Data
US 2020/0290007 A1    Sep. 17, 2020

(30) Foreign Application Priority Data
Sep. 5, 2017    (GB) ..................................... 1714266

(51) Int. Cl.
*H04N 1/024* (2006.01)
*H04N 1/00* (2006.01)
*G06K 15/10* (2006.01)

(52) U.S. Cl.
CPC ........... *H04N 1/0005* (2013.01); *G06K 15/10* (2013.01); *G06K 15/105* (2013.01);
(Continued)

(58) Field of Classification Search
CPC ............ H04N 1/0005; H04N 1/00082; H04N 1/00997; H04N 1/02418; H04N 1/02463; G06K 15/10; G06K 15/105
See application file for complete search history.

(56) References Cited

U.S. PATENT DOCUMENTS 6,232,072 B1    5/2001    Fisher
6,558,623 B1    5/2003    Ganz et al.
(Continued)

FOREIGN PATENT DOCUMENTS

CN    1573330    2/2005
CN    1598872    3/2005
(Continued)

OTHER PUBLICATIONS

UK Search Report on GB1714266.2 dated Mar. 6, 2018; 4pgs.
(Continued)

*Primary Examiner* — Moustapha Diaby
(74) *Attorney, Agent, or Firm* — Foley & Lardner LLP

(57) ABSTRACT

A microarrayer for dispensing reagent onto a substrate, comprising a dispensing print head adapted to load reagent and provided with a plurality of nozzles to dispense said at least reagent on the substrate, wherein the print head is mounted in the microarrayer to allow the print head to move with respect to the substrate in subsequent, essentially, parallel print passes, wherein the print head moves during a first print pass between a first end of the substrate toward a second end of the substrate and during a subsequent print-pass in the opposite direction, the microarrayer being characterised in that the microarrayer comprises a first camera adapted to move behind the print head during a print pass and a second camera adapted to move ahead of the print head during said print pass, the first and second camera being adapted to obtain images of the substrate.

8 Claims, 1 Drawing Sheet

(52) U.S. Cl.
CPC ..... *H04N 1/00082* (2013.01); *H04N 1/00997* (2013.01); *H04N 1/02418* (2013.01); *H04N 1/02463* (2013.01)

(56) References Cited

U.S. PATENT DOCUMENTS

| | | | |
|---|---|---|---|
| 7,141,368 B2 | 11/2006 | Fisher et al. | |
| 2003/0104370 A1* | 6/2003 | Fisher | B01J 19/0046 427/2.11 |
| 2003/0143756 A1* | 7/2003 | Fisher | B01J 19/0046 435/6.19 |
| 2004/0023223 A1 | 2/2004 | Thompson et al. | |
| 2004/0062686 A1 | 4/2004 | Ganz et al. | |
| 2005/0057595 A1 | 3/2005 | De Grijs | |
| 2006/0044378 A1* | 3/2006 | Kim | G01N 21/95607 347/104 |

FOREIGN PATENT DOCUMENTS

| | | |
|---|---|---|
| CN | 205451080 | 8/2016 |
| CN | 106738896 | 5/2017 |
| EP | 1273349 A1 | 1/2003 |
| EP | 2 058 135 A1 | 5/2009 |
| JP | H1188711 A | 3/1999 |
| JP | 2006-064699 A | 3/2006 |
| JP | 2009-511346 A | 3/2009 |
| KR | 1020110061265 A | 6/2011 |

OTHER PUBLICATIONS

International Search Report and Written Opinion of the International Searching Authority on PCT/GB2018/052505 dated Oct. 26, 2018 (13 pages).
Examination Report on GB Appln. 1714266.2 dated Mar. 25, 2022 (2 pages).
Chinese Office Action on CN Appln 201880057253.9 dated Jun. 10, 2021.
Japanese Office Action on JP Appln. 2020-511346 dated Jun. 21, 2022 (12 pages, including English translation).

* cited by examiner

MICROARRAYER FOR DISPENSING REAGENT ON A SUBSTRATE AND A METHOD FOR OBTAINING IMAGES OF THE SUBSTRATE DURING THE OPERATION OF SAID MICROARRAYER

CROSS REFERENCE TO RELATED APPLICATIONS

The present application is a U.S. National Stage Application under 35 U.S.C. § 371 of International Patent Application No. PCT/GB2018/052505, filed on Sep. 5, 2018, which claims the benefit of priority to United Kingdom Patent Application No. 1714266.2, filed on Sep. 5, 2017, the disclosure of each of which is incorporated by reference herein in its entirety.

FIELD OF THE INVENTION

The invention relates generally to a method and a device for manufacturing microarrays. A microarray comprises plurality of spots, each spot comprising a material comprising biomolecules. The microarray is produced by printing an adapted reagent, comprising said biomolecules on a substrate using a dispensing print head, In particular, there is described a method and a device of printing microarrays, inspecting the quality of the printed microarrays to determine whether the microarrays are correctly printed by reviewing the presence, location and size of individual spots printed on the substrate and for providing means for taking corrective action to improve the quality of the printed microarrays.

BACKGROUND OF THE INVENTION

Microarrays (also known as biochips) are important in the study of biomolecules such as genomic DNA, cDNA, oligonucleotide sequences, proteins, antibodies and the like. Suitably biomolecules are provided to a substrate in an ordered array and then analytes can be provided to the substrate to determine binding to the biomolecules of the substrate. This can be useful in analysis of biomolecular interactions or reactions, for example to profile gene expression, discovery of therapeutic molecules, or to measure protein binding. Printing of the biomolecules onto a substrate allows such analysis to be undertaken on large number of samples.

Microarrays are printed by means of an array printer, or microarrayer, comprising a dispensing print head, such as an inkjet array printer. The dispensing print head is used to print a reagent loaded in the print head, comprising the biomolecules, on a solid substrate, such as a slide. Normally, the print head will be loaded with a plurality of reagents, each comprising a specific biomolecule. The slides to be printed are loaded onto a tray and the print head is moved with respect of the tray in subsequent print passes to print all the slides in a complete print job. Once all the slides have been printed, the tray and the slides are removed from the array printer.

A significant problem in printing of biomolecules is the print variation of the spots containing the biomolecules onto the substrate. For example the size, shape or the location of the spots can be incorrectly provided on the array, or indeed the spot may not be printed at all.

The task of printing microarrays requires the transfer of extremely small amounts of many different reagents from separate wells in the print head to closely spaced positions on the substrate. Printing of microarrays can be done by projecting the printing liquid through the air onto the substrate without contact using, for instance, a print head provided with a nozzles, such as an inkjet print head. Alternatively, another type of print head could be used such as a bubble jet.

Typically the main difficulty with such inkjet technology is that air in a nozzle can cause it to print misplaced or malformed spots or fail to print a spot. Several factors can cause printing errors. These factors include blockage or failure of a nozzle, sample precipitation, unsuitable sample viscosity or empty reagent wells.

U.S. Pat. No. 6,558,623 discloses a device and a method to quality check or inspect microarrays, once a slide is completed. The device and the method according to U.S. Pat. No. 6,558,623 are particularly adapted to print a multitude of microarrays on slides during a print job and to review the overall quality of the slides at the end of the print job to qualify the slides pass or fail.

Whilst known inspection and analysis techniques have discussed control systems which check for spot quality on a substrate on which printing of spots has been completed, either by manual intervention or automatically, this typically requires interaction at the end of a completed print job. This means that after a print run in which a plurality of slides have been printed, the quality of the slides can be analysed and corrective action can be taken to correct printed slides. The effect of this can be that additional reagent needs to be provided to the print head to allow correcting printed slides. This can be costly and/or time consuming.

The aim of the invention is to further improve an apparatus for printing microarrays and to provide a method for more efficiently producing microarrays and for obtaining images of a printed microarray to allow checking the quality of the microarrays during the operation of an apparatus for printing the microarrays.

SUMMARY OF THE INVENTION

According to a first aspect of the present invention there is provided a microarrayer for dispensing reagent onto a substrate, comprising a dispensing print head adapted to load reagent and provided with a plurality of nozzles to dispense said at least reagent on the substrate, wherein the print head is mounted in the microarrayer to allow the print head to move with respect to the substrate in subsequent, essentially, parallel print passes, wherein the print head moves during a first print pass between a first end of the substrate toward a second end of the substrate and during a subsequent printpass in the opposite direction, the microarrayer being characterised in that the microarrayer comprises a first camera adapted to move behind the print head during a print pass and a second camera adapted to move ahead of the print head during said print pass, the first and second camera being adapted to obtain images of the substrate.

During the printing of microarrays, a print head will typically move from left to right over a substrate and subsequently from right to left in subsequent printpasses to print subsequent print rows. The advantage of having a first camera moving behind the print head during a print pass and a second camera adapted to move ahead of a print head during said printpass is that when moving from left to right or from right to left, there will always be a camera available to obtain images of the microarray printed on the substrate. The position of the at least first and second camera ahead of and behind the print head will allow immediate inspection of the printed array during the operation of a microarrayer.

Suitably, during a printpass, the camera ahead of the print head is adapted to obtain an image of the support for dispensing of the at least one reagent on a substrate and the camera behind the printer is adapted to obtain an image of the support after dispensing of the reagent on the substrate.

Suitably, the at least first and second camera and the print head are positioned on a straight line.

Suitably, the microarrayer is provided with processing means connected to the at least first and second camera, to allow the processing means to process images obtained by said at least first and second camera.

Suitably, the microarrayer is provided with control means, connected to the processing means, wherein the control means are adapted to generate instructions for operating the print head based on data received from the processing means.

Suitably, the microarrayer is provided with illumination means, to illuminate the substrate prior to or during the obtaining of an image by means of the at least one and/or second camera.

Suitably, the microarrayer is provided with reflective means positioned underneath the support to reflect light transmitted by means of the illumination means, to increase the contrast of the images to be obtained by the at least first and second camera.

According to a second aspect of the present invention, there is provided a method for obtaining images of a substrate during the operation of a microarrayer for dispensing solution onto a substrate, wherein the microarrayer comprises a dispensing print head adapted to load reagent and provided with a plurality of nozzles to dispense said reagent on the substrate, the print head being mounted in the microarrayer to allow the print head to move with respect to the substrate in subsequent, essentially, parallel print passes, wherein the print head moves during a first print pass between a first end of the substrate toward a second end of the substrate and during a subsequent printpass in the opposite direction, wherein the microarrayer further comprises a first camera adapted to move behind the print head during a print pass and a second camera adapted to move ahead of the print head during said print pass, wherein the method comprises:

moving the print head with respect to the substrate in a first printpass, dispensing reagent on the substrate by using the print head, and using the camera moving behind the print head to obtain an image of the reagent printed on the substrate Suitably, the method comprises using the camera moving ahead of the print head to obtain an image of the substrate before the dispensing of the at least one reagent by means of the print head, and using the camera moving behind the print head to obtain an image of the substrate after the dispensing of the reagent on the substrate.

Suitably, the microarrayer is provided with processing means, wherein the method comprising:

connecting the processing means to the first and second camera, sending data relating to images obtained by means of the first and second camera to the processing means, and using the processing means to process the data received from the first and second camera to thereby obtain information relating the reagent printed on the substrate.

Suitably, the microarrayer is provided with control means for controlling the operation of the print head, the method comprising:

connecting the control means to the processing means, sending the information relating the reagent printed on the substrate from the processing means to the control means, using the control means to generate instructions for operating the print head, based on information received from the processing means, and using the control means to send instructions to the print head, Suitably, the microarrayer is provided with illumination means, wherein the method comprises:

using illumination means to illuminate the substrate prior to or during the obtaining of an image by means of the first and/or second camera.

Suitably, the microarrayer is provided with reflective means positioned underneath the substrate, wherein the method comprises:

using the reflective means to reflect light transmitted by means of the illumination means to thereby increase the contrast of the images to be obtained by the first and second camera.

BRIEF DESCRIPTION OF THE DRAWING

Embodiments of the invention will now be described by way of example only with reference to the drawing, in which.

DETAILED DESCRIPTION

Figure 1:
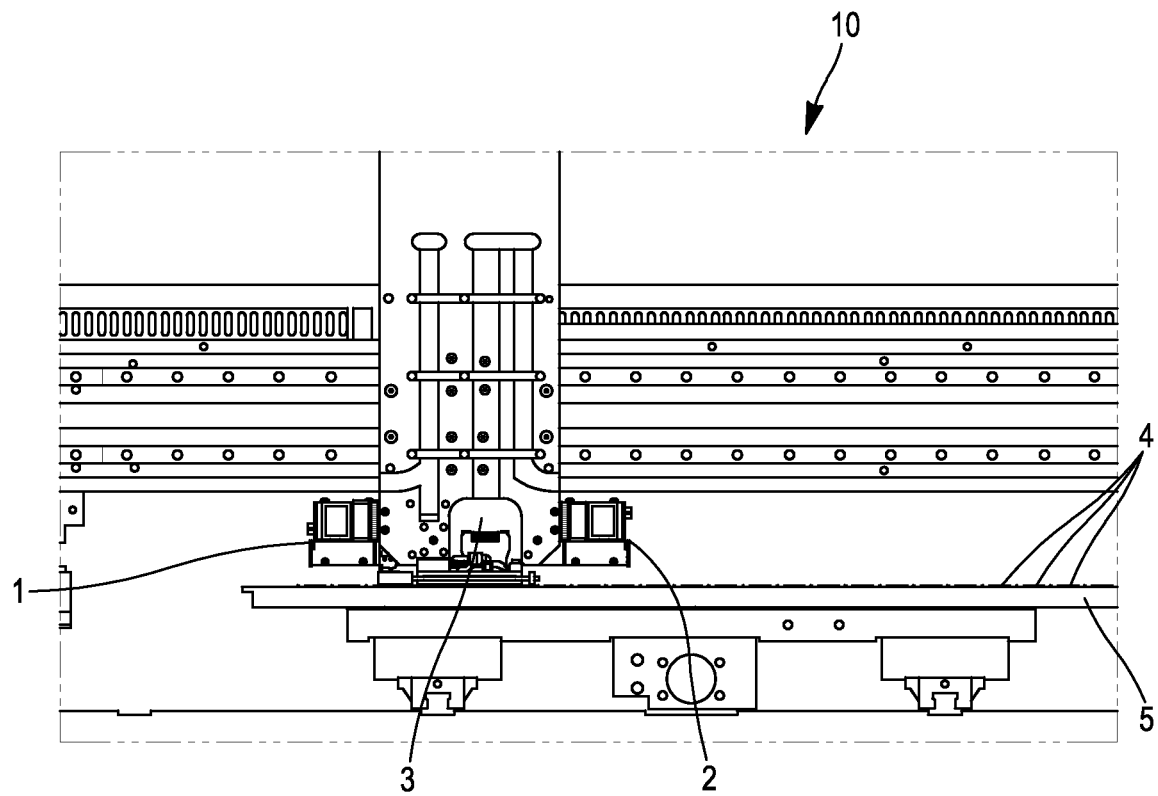
FIG. 1 illustrates a cross sectional view of apparatus of the present invention.

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

In the present description, reference is made to a reagent. The word reagent is intended to refer to any biological material which is adapted to be used for obtaining microarrays by means of printing.

In the present description, the word microarrays is used to refer to a substrate provided with a plurality of spots dispensed on top of the substrate wherein the spots are dispensed on the substrate in an orderly manner, each of the spots containing a determined quantity of biological material.

In the present description, reference is made to a print head. The print head is intended to refer to an apparatus adapted to dispense biological material on a substrate, for instance by using a plurality of nozzles.

Referring to FIG. 1, a cross sectional view of a microarray printer or microarrayer 10 is shown. The microarrayer 10 comprises a print head 3 which is adapted to dispense reagent on a substrate. The print head 3 is typically adapted to load a plurality of reagents, wherein each of the wells for containing said reagents is connected to a plurality of nozzles for dispensing the reagents on the substrate. As will be appreciated, the print head 3 can be adapted to print onto any suitable substrate such as nitrocellulose, polyvinylchloride, Nylon membranes or glass.

The print head 3 is mounted in the microarrayer to allow relative movement of the print head 3 with respect to a substrate. According to FIG. 1 the print head 3 is used to print a plurality of slides 4 which are positioned on a tray 5 on which a plurality of slides 4 is positioned. As seen in FIG. 1, the print head 3 is typically adapted to move from left to right over the tray 5 in a first print pass and then to move backwards from right to left in a subsequent printpass wherein the first and each subsequent printpass are essentially parallel.

The microarrayer 10 is provided with a first camera 1 and a second camera 2 which are positioned at opposite sides of the print head 3. The camera 1 is adapted to move behind the print head 3 when the print head 3 is moving in a printpass from left to right as seen in FIG. 1. That means that camera 1 can obtain an image of the substrate or slide 4 during the movement of the assembly of the print head 3 and the first camera 1 and the second camera 2 from left to right as seen in FIG. 1. Once a first printpass is completed, the movement of the assembly of the print head 3 and the first camera 1 and the second camera 2 will be inversed. In a subsequent printpass, the camera 2 will be positioned behind the print head 3 and therefore in a subsequent printpass the camera 2 can be used to obtain images of the substrate 4 after printing of a reagent on the substrate by means of the print head 3.

In order for the microarrayer 10, according to FIG. 1, to function properly, the cameras 1 and 2 are mounted inline with the print head 3, wherein the camera 1 and the camera 2 each have a determined distance with respect to the print head 3. Moreover, the cameras 1 and 2 will be perpendicular with respect to the substrate 4 allow proper imaging of the substrate 4 by means of the cameras 1 and 2.

In a specific embodiment of the invention, it is possible to use both the first camera 1 and a second camera 2 to obtain images of the substrate 4 during a single printpass. For instance, when the print head 3 is moving from right to left, as seen in FIG. 1, the first camera 1 can be used to obtain an image of the substrate 4 prior to dispensing reagent on a substrate 4 by means of the print head 3. Subsequently, camera 2 can be used to obtain an image of the substrate 4 after the dispensing of reagents on the substrate 4 by means of the print head 3. That means that the images of both camera 1 and camera 2 can be used to analyse the microarray obtained after the dispensing of reagent on the substrate 4. For instance, if camera 1 has obtained an image of the slide 4 prior to printing a possible defect or misalignment or contamination of the slide can be observed. This information can be used to improve the analysis of the image of the same slide once the microarray has been printed.

In the microarrayer 10, according to FIG. 1, the first and second camera 1, 2 will be connected to processing means (not shown in FIG. 1). These processing means are specifically adapted to perform image processing to retrieve from the images obtained by cameras 1 and 2 information on the quality of the microarrays produced on the substrate. The processing means will be provided with known algorithms to allow image processing. The effect of the image processing will be to calculate parameters, related to the quality of the printed microarrays. The processing means will be connected to control means (not shown in FIG. 1) which are specifically adapted to generate instructions of operating print head 3. This means that once the processing means have processed images obtained by cameras 1 and 2, data can be forwarded to the control means to generate instructions for the print head 3, for instance, to alter the operation of the print head 3 in a subsequent printpass to thereby improve the quality of microarrays to be printed.

According to an embodiment of the invention, the control means will be able to recognise whether possible printing defects observed in microarrays obtained during a printpass are either random errors or non-random errors. In case the errors observed in the microarrays are non-random errors, specific amendment of the print head 3 is possible to improve the quality of microarrays to be printed. For instance, in case the processing means, after analysis of a series of images, have determined that the spots obtained by using a specific nozzle in the print head contain printing errors, the control means can generate an instruction to the print head to no longer use the respective nozzle. In a subsequent printpass, instead of using the defective nozzle, an alternative nozzle can be used to avoid repetition of the printing error. Additionally, if spots are not printed they can be reprinted on the fly by repeating the print pass using alternative nozzles.

The assembly of the print head 3 and the cameras 1 and 2 will be provided with illumination means to allow illumination of the substrate prior to or during obtaining of images by means of the cameras 1 and 2. Typically, the illumination means will be adapted to eliminate the substrate having the direction of the impact of the light on the substrate being perpendicular to the surface of the substrate. Depending on the reagent printed on the substrate and on the material used for the substrate, there will be a difference in the capacity of the reagent and the substrate to reflect light impacted on the substrate. This difference in reflection allows obtaining of images representative of the microarray produced on the substrate.

According to an exemplary embodiment of the invention, cameras 1 and 2 may have the form of a charge-coupled device (CCD) digital camera. Alternatively, the camera may be of the type of an IR or UV camera.

According to an exemplary embodiment of the invention, the illumination means used to illuminate the substrate prior to or during the obtaining of images will comprise light emitting diodes (LED).

Figure 2:
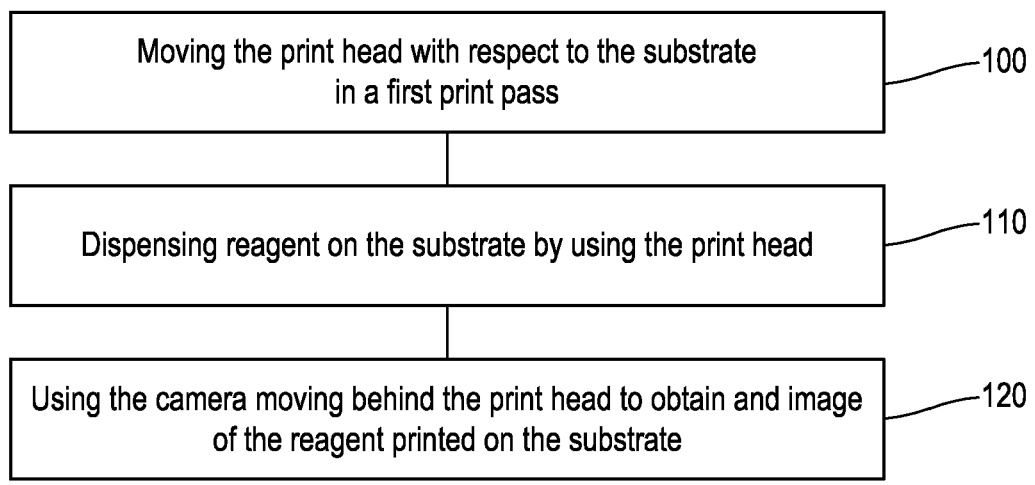
FIG. 2 illustrates a flowchart of the method of the present invention.

FIG. 2 shows a flow chart of the method according to the invention, wherein the method relates to obtaining images of a substrate during the operation of a microarrayer for dispensing solution onto a substrate, wherein the microarrayer comprises a dispensing print head adapted to load reagent and provided with a plurality of nozzles to dispense said reagent on the substrate, the print head being mounted in the microarrayer to allow the print head to move with respect to the substrate in subsequent, essentially, parallel print passes, wherein the print head moves during a first print pass between a first end of the substrate toward a second end of the substrate and during a subsequent print pass in the opposite direction, wherein the microarrayer further comprises a first camera adapted to move behind the print head during a print pass and a second camera adapted to move ahead of the print head during said print pass.

As represented in FIG. 2, the method comprises a first step (100) for moving the print head with respect to the substrate in a first print pass.

The method further comprises a further step (120) for dispensing reagent on the substrate by using the print head.

The method comprises a further step of using the camera moving behind the print head to obtain an image of the reagent printed on the substrate.

The invention claimed is:

1. A microarrayer for dispensing reagent onto a substrate, comprising a dispensing print head adapted to load reagent and provided with a plurality of nozzles to dispense said at least reagent on the substrate, wherein the print head is mounted in the microarrayer to allow the print head to move with respect to the substrate in subsequent, essentially, parallel print passes, wherein the print head moves during a first print pass between a first end of the substrate toward a second end of the substrate and during a subsequent printpass in the opposite direction, the microarrayer being characterised in that the microarrayer comprises a first camera adapted to move behind the print head during a print pass and a second camera adapted to move ahead of the print head during said print pass, the first and second cameras being adapted to obtain images of the substrate, wherein the microarrayer is provided with processing means connected to the first and second cameras, to allow the processing means to process images obtained by said first and second cameras during the first print pass and to calculate parameters based on the processed images and relating to the reagent printed on the substrate, wherein the microarrayer is provided with control means, connected to the processing means, and wherein the control means are adapted to generate instructions for the print head, to alter the operation of said print head in the subsequent print pass, based on the calculated parameters.

2. The microarrayer according to claim 1, wherein during a print pass the camera ahead of the print head is adapted to obtain an image of the substrate before the dispensing of the reagent on the substrate and wherein the camera behind the print head is adapted to obtain an image of the substrate after the dispensing of the reagent on the substrate.

3. The microarrayer according to claim 1, wherein the first and second cameras and the print head are positioned on a straight line.

4. The microarrayer according to claim 1, wherein the microarrayer is provided with illumination means to illuminate the substrate prior to or during the obtaining of an image by means of the first and/or second cameras.

5. The microarrayer according to claim 4, wherein the microarrayer is provided with reflective means positioned underneath the substrate, to reflect light transmitted by means of the illumination means to thereby increase the contrast of the images to be obtained by the first and second cameras.

6. Method for obtaining images of a substrate during the operation of a microarrayer for dispensing solution onto a substrate, wherein the microarrayer comprises a dispensing print head adapted to load reagent and provided with a plurality of nozzles to dispense said reagent on the substrate, the print head being mounted in the microarrayer to allow the print head to move with respect to the substrate in subsequent, essentially, parallel print passes, wherein the print head moves during a first print pass between a first end of the substrate toward a second end of the substrate and during a subsequent printpass in the opposite direction, wherein the microarrayer further comprises a first camera adapted to move ahead of the print head during a print pass and a second camera adapted to move behind the print head during said print pass, wherein the method comprises:

moving the print head with respect to the substrate in a first printpass;

dispensing reagent on the substrate by using the print head;

during said first print pass, using the first camera moving ahead of the print head to obtain an image of the substrate before the dispensing of the at least one reagent by means of the print head;

during said first print pass, using the second camera moving behind the print head to obtain an image of the substrate after the dispensing of the reagent on the substrate;

connecting a processing means to the first and second cameras;

sending data relating to images obtained by means of the first and second cameras to the processing means;

using the processing means to process the data received from the first and second cameras to thereby calculate parameters based on the processed images and relating to the reagent printed on the substrate;

connecting a control means for controlling the operation of the print head to the processing means;

sending the calculated parameters relating to the reagent printed on the substrate from the processing means to the control means;

using the control means to generate instructions for the print head, to alter the operation of said print head in the subsequent print pass, based on the calculated parameters received from the processing means, and using the control means to send instructions to the print head.

7. The method according to claim 6, wherein the microarrayer is provided with illumination means, the method comprising:

using illumination means to illuminate the substrate prior to or during the obtaining of an image by means of the first and/or second cameras.

8. The method according to claim 7, wherein the microarrayer is provided with reflective means positioned underneath the substrate, the method comprising:

using the reflective means to reflect light transmitted by means of the illumination means to thereby increase the contrast of the images to be obtained by the first and second cameras.

* * * * *